United States Patent
Gilliam

(10) Patent No.: US 6,762,426 B1
(45) Date of Patent: Jul. 13, 2004

(54) THREADED FASTENER INSPECTION METHOD

(76) Inventor: Ronald D. Gilliam, 46828 Butternut Ridge Rd., Oberlin, OH (US) 44074

(*) Notice: Subject to any disclaimer, the term of this patent is extended or adjusted under 35 U.S.C. 154(b) by 60 days.

(21) Appl. No.: 10/300,964

(22) Filed: Nov. 22, 2002

Related U.S. Application Data

(60) Provisional application No. 60/370,192, filed on Apr. 8, 2002.

(51) Int. Cl.[7] .................................................. G01V 8/00
(52) U.S. Cl. .............................. 250/559.12; 250/559.13; 356/237.1; 382/152
(58) Field of Search ........................ 250/559.12, 559.13, 250/559.29, 559.31, 559.46; 356/237.1–237, 601, 614, 622–623, 394; 382/141, 152; 348/86, 92, 129; 901/46–47

(56) References Cited

U.S. PATENT DOCUMENTS

| | | | | |
|---|---|---|---|---|
| 2,057,927 A | * | 10/1936 | Charles | 356/394 |
| 5,506,682 A | * | 4/1996 | Pryor | 356/623 |
| 6,055,329 A | * | 4/2000 | Mufti | 382/152 |
| 6,177,682 B1 | * | 1/2001 | Bartulovic et al. | 250/559.44 |
| 6,437,355 B1 | * | 8/2002 | Nishino | 250/559.19 |
| 6,542,236 B1 | * | 4/2003 | Kim | 356/394 |

* cited by examiner

*Primary Examiner*—David Porta
*Assistant Examiner*—Patrick J. Lee
(74) *Attorney, Agent, or Firm*—John F. McDevitt

(57) ABSTRACT

An optical inspection system is disclosed to detect any cross threading or improper insertion of a threaded fastener after being affixed to a workpiece. A plurality of laser devices is used for said inspection with the projected laser beams becoming partially blocked by the engaged fastener member. Gap spaces are formed in the projected light beam patterns by such obstruction for a subsequent comparison in automated analysis equipment.

14 Claims, 2 Drawing Sheets

THREADED FASTENER INSPECTION METHOD

RELATED PROVISION APPLICATION

This application relates to Provisional application Serial No. 60/370,192 filed by the present applicant on Apr. 8, 2002.

BACKGROUND OF THE INVENTION

This invention relates generally to an optical inspection method for determining the proper engagement of a threaded fastener into the mated opening of a workpiece and more specifically to an automated method employing particular light source means to evaluate certain physical parameters associated with the already engaged fastener.

Various inspection method are already widely used to automatedly evaluate the physical dimensions and/or profile of threaded fasteners. One method uses contact probes which touch the fastener at various points to determine if its dimensions or profile meet the inspection criteria. Use of such contact means has inherent limitations, however, by reason of contact wear and a requirement for accurate positioning during the particular evaluation process. Moreover, such inspection systems are generally slow to operate and can be limited in performance by the complexity of the particular fastener being evaluated. A variety of non-contact inspection systems are also now being used for this purpose, including automated optical systems as a means for characterizing the physical parameters of a threaded fastener, such as machine bolts and threaded plugs. For example, laser gauging systems are used in which the specific dimensional measurements of a threaded fastener can be evaluated. A representative laser inspection system enabling machine bolts to be sorted by automated means before being affixed to the workpiece is disclosed in U.S. Pat. No. 5,568,263.

SUMMARY OF THE INVENTION

There understandably remains a need for inspection of the threaded fastener after being affixed to the workpiece. Assembly line manufacture of automotive vehicles and many other products requires speedy detection of any improperly engaged fasteners during the assembly process. misalignment or cross threading of the fastener after being affixed to the workpiece can serious disrupt or disable the manufacturing process. Likewise, a failure to have the assembled fastener entirely threaded into the workpiece can cause similar harm. It would be further desirable that such novel inspection method be easily adapted for convenient use with existing assembly equipment during manufacture of a final product.

It is an object of the present invention therefore to provide a novel inspection method enabling detection of improperly engaged threaded fasteners after having been affixed to the workpiece.

It is another object of the present invention to provide an optical inspection method employing a particular array of laser devices to evaluate the height of an affixed threaded fastener above the workpiece.

It is also an object of the present invention to provide an optical inspection method employing a particular array of laser devices to evaluate any misalignment of the affixed threaded fastener.

It is a still further object of the present invention to provide an optical inspection method enabling detection of improperly affixed threaded fasteners by automated means.

These and still further objects of the present method are achieved by (a) orienting a plurality of laser devices around the circumference of an already engaged threaded fastener at a remote location therefrom, (b) projecting the beams from all said lasers to intercept the head end of said engaged threaded fastener at a predetermined angle with respect to the top surface of said threaded fastener head end, (c) detecting a gap distance in said projected laser beams after interception with said head end of said already engaged threaded fastener employing remote video means, and (d) utilizing the length of said gap distance with data processing means to automatedly determine proper engagement of said threaded fastener. In a preferred embodiment, three or more laser devices are disposed approximately equidistant around the circumference of said already engaged threaded fastener, the projected beams from all said lasers intercepting the center region of the head end of the engaged threaded fastener at an acute angle with respect to the top surface of said threaded fastener head end, detecting the gap distance in said projected laser beams after interception with said head end of said already engaged threaded fastener employing a remote video camera, comparing the gap distance for the individual projected laser beams, and utilizing any differences found in said gap distances to automatedly determine proper engagement of said threaded fastener. In said manner, the height of the already engaged threaded fastener above the surface of the workpiece to which it has joined can be determined for conformity with acceptance values previously stored in the selected data processing means. The gap distances measured in said manner are also found to be proportional to the height of the already engaged threaded fastener above the surface of the workpiece to which it has been joined. In a similar manner, such automated comparison of gap distances for the projected laser beams can determine any cross threading of the already engaged fastener. Thus, finding no significant difference in gap distances between individual projected laser beams determines that the head end of the already engaged threaded fastener lies reasonably parallel to the surface of the workpiece to which it has been joined. It can be appreciated that increasing the number of laser beams being employed in the present inspection method favorably provides more data values to be lodged in the associated data processing means. Additionally, the employment of computerized analysis equipment such as common machine vision inspection type apparatus, and the like, is contemplated for automated processing of the gap length comparisons being made in the present inspection method. It is contemplated that the present inspection method can be as effectively conducted with threaded fasteners engaged in a vertical direction as well as when engaged at angles other than vertical.

DESCRIPTION OF THE PREFERRED EMBODIMENT

Figure 1A:
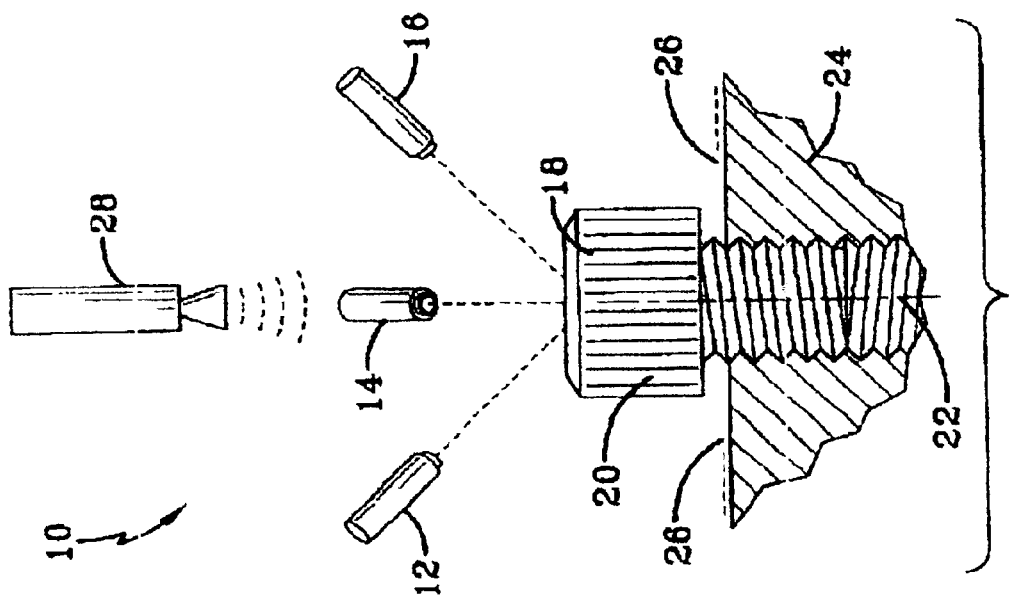
FIG. 1 is a pictorial view for a vertically disposed orientation of representative equipment means being employed to carry out the present inspection method.
Figure 1B:
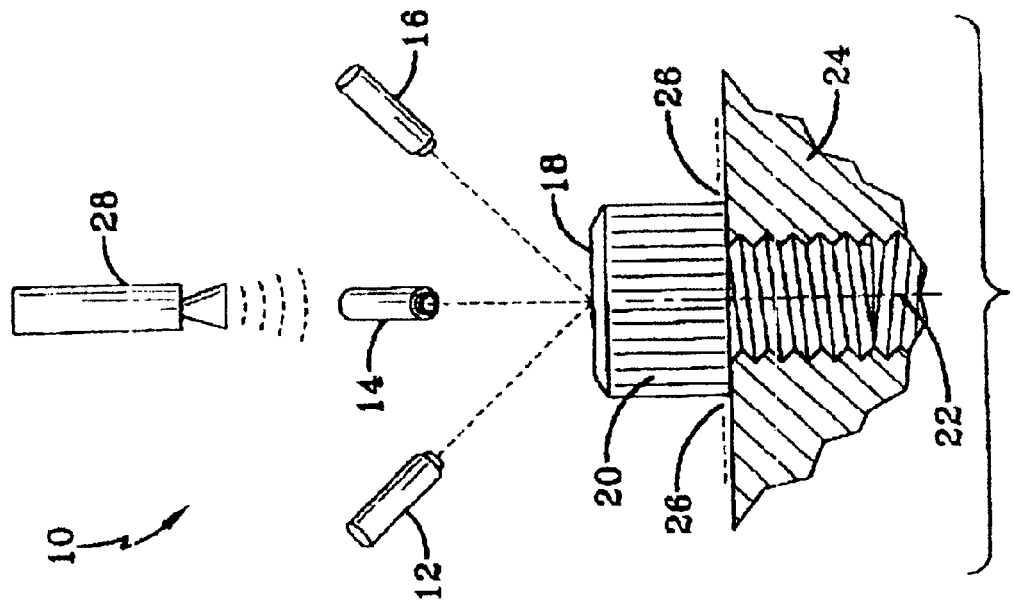

Referring to the drawings, FIGS. 1(a) and 1(b) depict a typical arrangement for the optical components being employed to generate light gap measurements according to the present method. A side view of said optical system 10 is shown having three laser devices 12, 14 16 disposed above the top surface 18 of threaded bolt member 20. Said individual laser devices are further spaced apart equally about the circumference of said machine bolt surface 18 while further being aligned to project laser beams at a 45 degree angle with respect to said horizontal surface. In doing so in said alignment, all laser light beams converge at or near the center region 22 of the engaged bolt member 20 which is shown to have previously been threaded into a mated opening of workpiece 24. The converging beam patterns of the present laser configuration will become partially blocked by the intervening bolt head surface with the beams being generated by such obstruction forming a gap in the further transmitted light beams. One of said light beam gaps 26 is shown with its length being found proportional to the height of said bolt member 20 extending above the horizontal top surface of workpiece 24. Typical values for said proportional relationship can be determined with an Autocad Model 2000 software program. As illustrated in FIG. 1(a), a value of 3.00 units is determined in said manner for the engaged bolt height whereas a 5.20 units value is obtained for the gap length in said projected laser beam when measured from the center of bolt member 20. The same proportional relationship is also shown to exist in FIG. 1(b) when the height of engaged bolt member 20 increases to 4.50 units causing the gap length to increase to 7.83 units. Any cross threading or height discrepancy of the engaged bolt member can thereafter be determined with said gap length measurements employing conventional automated analysis means. There is further employed in the depicted optical measurement system a representative video camera 28 disposed vertically above the top surface 18 of engaged bolt member 20. Said visual imaging means transfers the recorded gap length measurements to the selected data processing equipment for automated comparison therein according to the present method.

Figure 2:
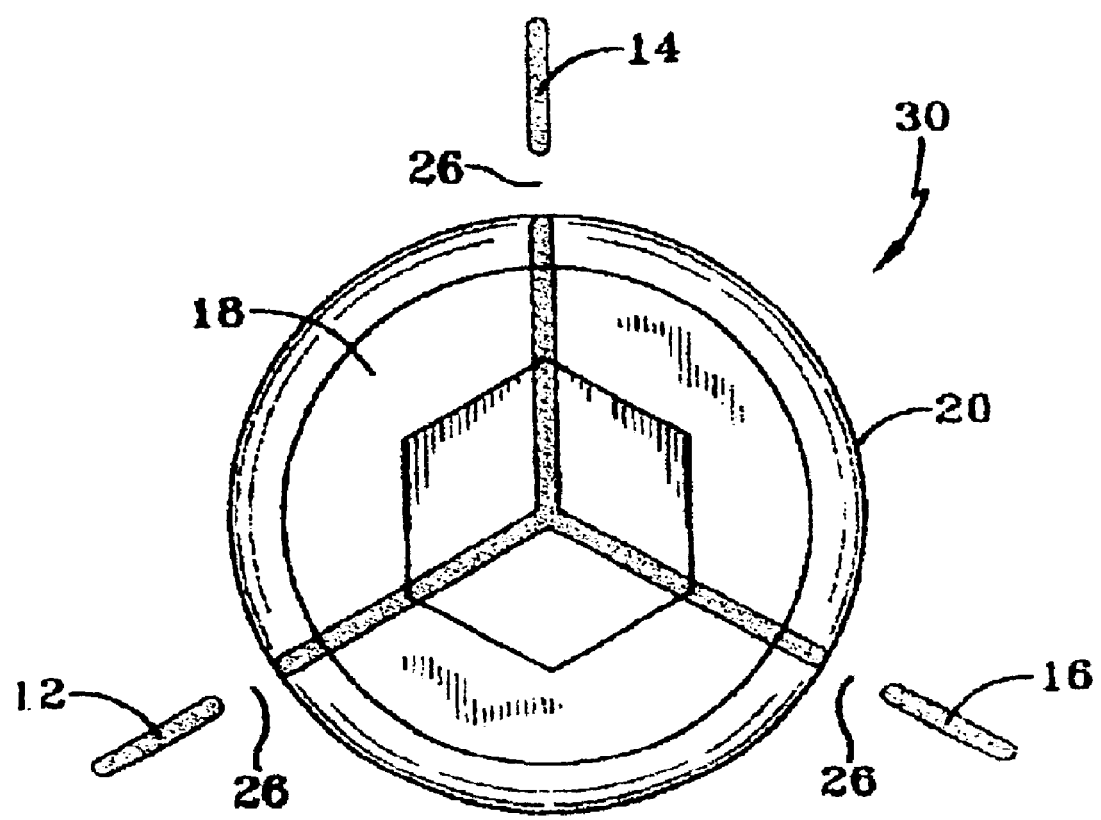
FIG. 2 depicts the visual image achieved with the video equipment means being employed in the FIG. 1 embodiment.

In FIG. 2 there is depicted a top view of the visual image displayed on video camera 28 for interception of all projected laser beams 12, 14 and 16 with top surface 18 of machine bolt head 20 in FIG. 1. Said visual image 30 displays the gaps 26 formed in said projected laser beams with the length values of said gaps being converted to electronic signals for processing with conventional data processing equipment (not shown). Representative automated data process apparatus for said purpose is more fully described in the above mentioned U.S. Pat. No. 5,568,263 reference which includes an electronic processor and controller. Alternately, employment of other computerized analysis equipment including well known machine vision inspection apparatus and the like enables automated processing of the gap length comparison being made in the present inspection method. From such comparison of said gap length values in said automated analysis equipment it will be determined if any cross threading of the already engaged fastener has occurred. Likewise, it can be determined from said gap length measurements that the engaged fastener has been fully threaded into the workpiece to the correct depth.

While a representative embodiment of the present inspection method has been herein described, it is to be understood that still other embodiments of said inspection procedure are also contemplated. For example, still other automated electronic analysis equipment other than herein specifically identified can be employed in the present inspection method. Likewise, laser devices which project multiple single line beams as well as converging beams can be employed to similar advantage in the present method. Accordingly, it is intended to cover all variations in the disclosed inspection method which may be devised by persons skilled in the art as falling within the true spirit and scope of the herein claimed invention.

What I claim as new and desire to secure by Letters Patent of the United States is:

1. An automated inspection method to determine proper engagement for a threaded fastener comprising the steps of:

(a) orienting a plurality of laser devices around the circumference of an already engaged threaded fastener at a remote location therefrom, (b) projecting the beams from all said lasers to intercept the head end of said engaged threaded fastener at a predetermined angle with respect to the top surface of said threaded fastener head end, (c) detecting a gap distance in said projected laser beams after interception with said head of said already engaged threaded fastener employing remote video means, and (d) utilizing the length of said gap distance with data processing means to automatedly determine proper engagement of said threaded fastener.

2. The method of claim 1 wherein at least three laser devices are positioned approximately equidistant around the circumference of said already engaged threaded fastener.

3. The method of claim 1 wherein said laser devices are aimed to intercept the center region of the head end of the already engaged threaded fastener.

4. The method of claim 1 which detects the height of the already engaged threaded fastener above the surface of the workpiece to which it has been joined.

5. The method of claim 1 which detects any cross thread defect for the already engaged threaded fastener.

6. The method of claim 1 wherein the gap distance in said projected laser beams is proportional to the height of the already engaged threaded fastener above the surface of the workpiece to which it has been joined.

7. The method of claim 1 wherein the remote video means being employed is a video camera.

8. The method of claim 1 wherein the data processing means being utilized includes electronic processor and controller means.

9. The method of claim 1 wherein the threaded fastener is engaged at angles other than vertical.

10. The method of claim 1 wherein multiple gap distances are formed in the projected laser beam pattern.

11. The method of claim 1 which includes a comparison of gap distances between individual projected laser beams.

12. The method of claim 11 wherein finding no significant difference in gap distances between individual projected laser beams determines that the head end of the already engaged threaded fastener lies reasonably parallel to the surface of the workpiece to which it has been joined.

13. An automatic inspection method to determine proper engagement for a threaded machine bolt already joined to an underlying workpiece comprising the steps of:

(a) orienting three laser devices approximately equidistant around the circumference of said already engaged threaded fastener, (b) projecting the beams from all said lasers to intercept the center region of the head end of the engaged threaded fastener at an acute angle with respect to the top surface of said threaded fastener head end, (c) detecting a gap distance in said projected laser beams after interception with said head end of said already engaged threaded fastener employing a remote video camera, (d) comparing the length of the gap distances between individual projected laser beams with data processing means, and (e) utilizing any differences found in said gap distances among the individual projected laser beams to automatedly determine proper engagement of said threaded fastener.

14. The method of claim 13 wherein the data processing means includes electronic processor and controller means.

* * * * *